United States Patent [19]

Rapaille et al.

[11] Patent Number: 5,273,771
[45] Date of Patent: Dec. 28, 1993

[54] SWEETENING COMPOSITION

[75] Inventors: André L. I. Rapaille, Knokke-Heist; Augusta M. A. Peremans, Berchem, both of Belgium

[73] Assignee: Cerestar Holding B.V., Belgium

[21] Appl. No.: 873,787

[22] Filed: Apr. 27, 1992

[30] Foreign Application Priority Data

Apr. 27, 1991 [GB] United Kingdom ............... 9109125

[51] Int. Cl.$^5$ ............................................. A23L 1/236
[52] U.S. Cl. .................................. 426/548; 426/658; 426/573; 426/578
[58] Field of Search ............... 426/658, 573, 578, 548

[56] References Cited

U.S. PATENT DOCUMENTS

| 4,871,571 | 10/1989 | Jensen et al. | |
| 4,883,685 | 11/1989 | Kondou | 426/658 |
| 4,886,677 | 12/1989 | Kondou | 426/658 |
| 5,043,169 | 8/1991 | Cherukuri et al. | 426/658 |

FOREIGN PATENT DOCUMENTS 0303295  8/1988  European Pat. Off.
0304915  8/1988  European Pat. Off.
0325790 12/1988  European Pat. Off.

OTHER PUBLICATIONS

Japanese Abstract JP1171455 publication date Jun. 7, 1989.

Primary Examiner—Joseph Golian
Attorney, Agent, or Firm—Cushman, Darby & Cushman

[57] ABSTRACT

A composition which is suitable as the sweetener base of a sweet, reduced calorie food product such as an instant pie filling or a bakery cream, comprises erythritol, sorbitol and a glucose oligomer having a DE of 10 to 30, particularly 20 to 23. The composition may also contain fructose and/or maltitol or an intense sweetener such as aspartame.

12 Claims, No Drawings

SWEETENING COMPOSITION

The present invention relates to a composition which is useful in formulating instant foods and which is sweet, has a relatively low calorie content and a texture which is acceptable for use in products such as instant pie filling and instant bakery cream.

Dietary trends in recent years have increasingly focussed on low calorie products to minimise obesity, while at the same time there has been a rising demand for instant or convenience products. One approach to reducing the calorie content of sweet products such as pies, puddings etc. is to replace some or all of the sucrose, which is the conventional sweetener, with lower calorie equivalents. There are many replacement sweeteners which have been proposed and which may be divided into two classes. The first class consists of high intensity synthetic sweeteners such as saccharin and aspartame which on a weight/weight basis are many times sweeter than sucrose. The second class of replacement sweeteners consists of products which, on a weight/weight basis, are about 0.5 to 1.5 times as sweet as an equivalent amount of sucrose. Examples of these sweeteners are fructose and the so-called sugar alcohols, particularly sorbitol, maltitol and erythritol.

The replacement of sucrose by one or more of the sweeteners described above brings with it problems of taste and texture. The intense sweeteners may bring a bitter tone along with the desired sweetness and, because they are so much sweeter than sucrose, they can only be used at very low concentrations which results in a reduction in the bulk of the foodstuff of which they form a part. It is difficult to find a replacement for this loss of bulk which requires a non-sweet, low-calorie product providing a textural effect akin to sucrose. Replacement sweeteners which have a sweetening power similar to sucrose and which do not therefore give rise to a loss of bulk often have disadvantages such as a positive calorie contribution, a sweetness which is detectably different from sucrose and, when used in quantity, possible side effects e.g. diarrhoea.

Erythritol, which has recently been developed as a replacement sweetener, has 60% of the sweetening power of sucrose, is highly crystalline, non-caloric and has the additional advantage of being non-cariogenic. Erythritol has therefore been suggested for many applications as a partial or total replacement for sucrose e.g. in chocolate (Japanese Patent Application 255828/88) and, together with another sugar alcohol, in cakes (Japanese Patent Application 144747/88), ice-cream, (Japanese Patent Application 94510/88) and hard candy (European Patent Application 303295). We have found however that although erythritol is an excellent substitute for sucrose its tendency to crystallise can, in certain applications, be disadvantageous e.g. in products submitted to freezing and thawing operations.

The other sugar alcohols which are used commercially are sorbitol and maltitol. Both of these products have an acceptable flavour but sorbitol in too large quantities can cause diarrhoea in susceptible individuals and it is our experience that in instant pie filling and instant bakery cream at least, the use of maltitol alone gives an unsatisfactory texture to the product.

We have now however devised a composition, comprising erythritol and sorbitol which may be used as the base for sweet products such as instant pie filling and instant bakery cream and which is free from the disadvantages described above.

According to the invention therefore a composition which is suitable as the sweetener base of a sweet, reduced-calorie foodstuff is characterised in that it comprises erythritol, sorbitol and a glucose oligomer of DE 10 to 30.

"Glucose oligomers" are polymers of glucose and are produced commercially by the controlled acid or enzymatic hydrolysis of starch. A hydrolysis product is characterised by its DE (dextrose equivalent) number which is the reducing power of the hydrolysate expressed as D-glucose on the dry basis but which is also indicative of the number of glucose units in the oligomer, low DE products having more units and vice versa.

The composition may also include other low calorie sweeteners, particularly fructose or maltitol, or small amounts of an intense sweetener, such as aspartame, according to taste. The composition according to the invention preferably comprises 5 to 50% by weight erythritol, 30 to 80% by weight sorbitol and 5% to 25% by weight glucose oligomer of DE 10 to 30. Fructose or maltitol, if present may amount to up to 35%, preferably 2 to 12%, by weight of the composition. These percentages are based on the total weight of erythritol, sorbitol, glucose oligomer and any other sweetening agents in the composition.

The glucose oligomer of DE 10 to 30 is produced by the controlled hydrolysis of starch. The starch may be any commercially available starch but is preferably maize or wheat starch. The glucose oligomer may be a so-called glucose syrup of DE 20 to 30 or a maltodextrin of DE 10 to 20. Preferably the glucose oligomer has a DE of 15 to 25, especially 20 to 23. The glucose oligomer is preferably a spray-dried product The erythritol, and any maltitol which may be present, preferably have particle sizes less than 300 microns so as to avoid any "gritty" mouth-feel to the product in which the composition is used.

The invention will now be illustrated by the following Examples in which compositions according to the invention were used to make instant pie filling and instant bakery cream. A typical pie filling contains, in addition to the composition according to the invention, pregelatinised starch, water, a setting agent, a preservative and a flavour, while a typical bakery cream will contain as additional ingredients, pregelatinised starch, water, milk solids, setting agent, colour and a flavour.

The instant pie fillings and instant bakery creams described in the following Examples were evaluated in part by three test methods as follows:

Penetrometer

The penetrometer measures the depth of penetration of a standard cone falling from a fixed height onto the test material. High figures indicate a less rigid product.

Steven's Texture Analyser

The Steven's Texture Analyser measures the force required for a standard cone to penetrate the test material to a fixed depth. High values are indicative of a more rigid product.

Baking Test

The baking test measures the stability of the pie filling or bakery cream during the baking process and consists of measuring the width of a standard size strip of the product on a baking tray before and after baking. The increase is the spread of the strip is expressed as a percentage of the initial width and should be as low as possible.

EXAMPLE 1

Instant Pie Filling

The instant pie filling was prepared by mixing together two compositions in a Hobart mixer. The first composition was constant throughout the series of experiments and was made up of 150 parts by weight pregelatinised maize starch, 10 parts by weight citric acid and 1000 parts by weight water. The second composition was the sweetener and was varied as follows:-

|  | (a) | (b) | (c) | (d) | (e) | (f) |
|---|---|---|---|---|---|---|
| Crystalline maltitol | 300 | 210 | 120 | — | — | — |
| Crystalline sorbitol | — | — | — | 135 | 180 | 150 |
| Crystalline erythritol | — | 90 | 180 | 135 | 90 | 90 |
| Crystalline fructose | — | — | — | 30 | 30 | 20 |
| Spay-dried maize-glucose oligomer DE 20 to 23 | — | — | — | — | — | 40 |

The results of evaluating the six instant pie fillings by the Penetrometer, Steven's Texture Analyser and the Baking Test were as follows:-

| Composition | (a) | (b) | (c) | (d) | (e) | (f) |
|---|---|---|---|---|---|---|
| Penetrometer after 0 minutes | 313 | 308 | 313 | 318 | 318 | 308 |
| Penetrometer after 15 minutes | 285 | 295 | 288 | 292 | 291 | 295 |
| Steven's Texture Analyser after 15 minutes | 81 | 80 | 82 | 83 | 76 | 78 |
| Steven's Texture Analyser after 60 minutes | 86 | 81 | 84 | 85 | 80 | 81 |
| Baking Test | 68.4 | 71.4 | 68.4 | 52.4 | 77.8 | 70 |

Compositions (a) and (b) in which the sweetening component was primarily maltitol gave a pie filling which had a slimy texture and lacked body. The pie filling which contained the largest amount of erythritol ie (c) became hard and blind after baking and chilling, probably due to erythritol crystallisation. The pie fillings represented by (d) and (e) also had a tendency to crystallise. Pie filling (f), according to the invention, had good baking stability, a good structure, an acceptable sweetness, good mouth texture, good freeze/thaw stability (no water separation after two cycles), good structure after thawing and good storage stability (10 days at 4° C.). A similar composition without the fructose was less sweet but still acceptable. The pie filling according to (f) contained 32% less calories than a comparable filling in which the sweetener was 300 parts by weight sucrose.

EXAMPLE 2

Instant Bakery Cream

In the same manner as in Example 1 the instant bakery creams were prepared by mixing together two compositions one of which was kept constant throughout the series of experiments. The constant composition consisted of 100 parts by weight pregelatinised maize starch, 80 parts by weight whole milk solids, 7 parts by weight LACTICOL F 336 (Trademark and product of KELCO International Inc.), one part by weight colour (E 102/E 110) and flavouring (vanilla aroma powder) and 1000 parts by weight water. The second composition which was the sweetener was varied as follows:-

|  | (a) | (b) | (c) |
|---|---|---|---|
| Crystalline maltitol | — | 112 | 56 |
| Crystalline sorbitol | 112 | — | 56 |
| Crystalline erythritol | 65 | 65 | 65 |
| Crystalline fructose | 15 | 15 | 15 |
| Spay-dried maize - glucose oligomer DE 20 to 23 | 20 | 20 | 20 |

The compositions were evaluated by the Penetrometer, the Steven's Texture Analyser and in the Baking Test. The results were as follows:

| Composition | (a) | (b) | (c) |
|---|---|---|---|
| Penetrometer after 0 minutes | 340 | 335 | 351 |
| Penetrometer after 15 minutes | 278 | 272 | 278 |
| Steven's Texture Analyser after 15 minutes | 105 | 115 | 107 |
| Steven's Texture Analyser after 60 minutes | 185 | 168 | 162 |
| Baking Test | 33.3 | 68.4 | 77.4 |

The instant bakery cream (b) had a poor texture and was slimy and although bakery cream (c) was better in this respect it was not as good as (a) which, in this application, is the preferred formulation.

all three formulations contained 26% fewer calories than the equivalent bakery cream in which the sweetener was 212 parts by weight sucrose.

We claim:

1. A composition which is suitable as the sweetener base of a sweet, reduced calorie food product, said composition comprising 5 to 50% by weight erythritol, 30 to 80% by weight sorbitol and 5 to 25% by weight glucose oligomer of DE 10 to 30.

2. A composition according to claim 1 in which the glucose oligomer has a DE 10 to 25.

3. A composition according to claim 1 or claim 2 which also contains fructose and/or maltitol.

4. A composition according to claim 1 which also contains an intense sweetener.

5. A composition according to claim 1 in which the glucose oligomer is spray dried.

6. A composition according to claim 1 in which the erythritol has a particle size less than 300 microns.

7. A composition according to claim 3 which comprises up to 35% by weight fructose.

8. An instant pie filling which comprises pregelatinised starch, water, flavour and a composition according to claim 1.

9. A bakery cream which comprises pregelatinised starch, water, flavour, milk solids and a composition according to claim 1.

10. A composition according to claim 2 in which the glucose oligomer has a DE 20 to 23.

11. A composition according to claim 4 in which the intense sweetener is aspartame.

12. A composition according to claim 6 which also contains maltitol, the particle size of the maltitol being less than 300 microns.

* * * * *